2,486,769

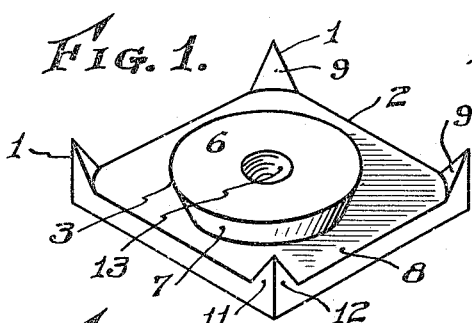
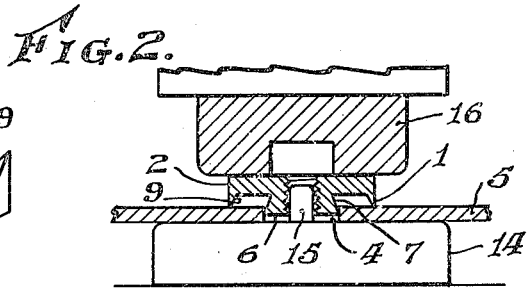
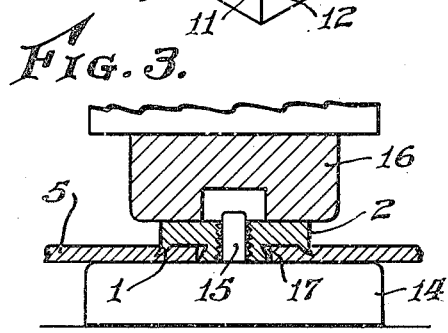
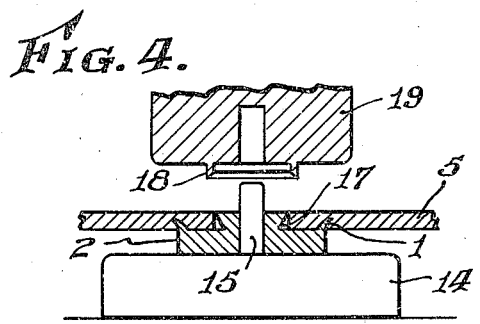
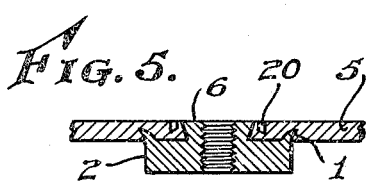
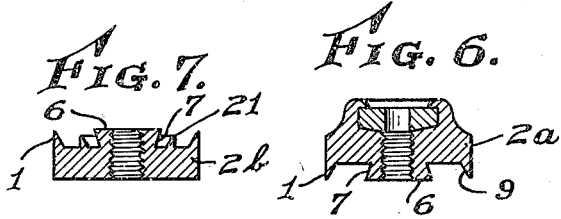
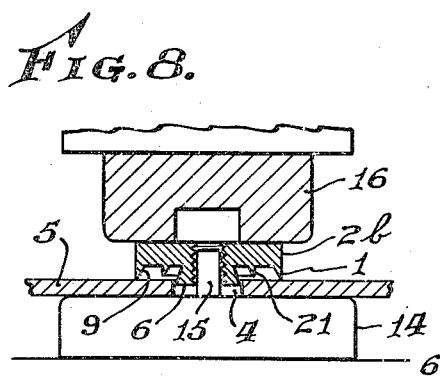
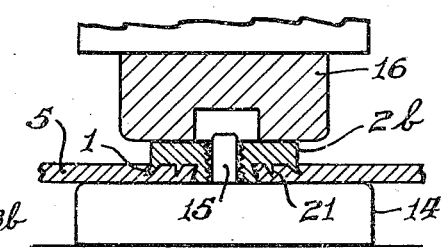
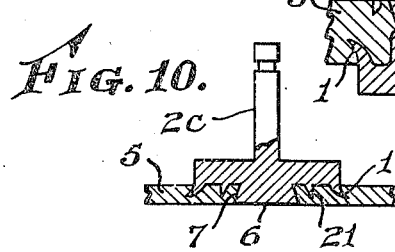
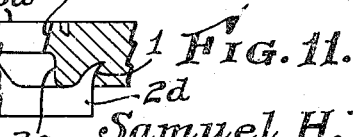
Inventor
Samuel H. Watson, Jr.
By C. D. Tuska
Attorney Patented Nov. 1, 1949

UNITED STATES PATENT OFFICE 2,486,769

STAKED FASTENER

Samuel H. Watson, Jr., Audubon, N. J., assignor to Radio Corporation of America, a corporation of Delaware Application December 31, 1942, Serial No. 470,771

10 Claims. (Cl. 85—32)

This invention relates to an improved method of, and means for, staking a boss such, for example, as a nut, bolt, screw, rivet, grommet, electric terminal shaft or analogous fixture to a chassis, panel or other base.

It has previously been proposed to provide the base of a metal boss with one or more projections for staking the boss more or less permanently to a support. The prior art recognizes two general types of "staked fasteners," (i) the type exemplified by U. S. Patent No. 945,737, wherein the stakes comprise prongs or thin blades which are adapted to be thrust into or through a support constituted of wood or similar material and (ii) the type, exemplified by U. S. Patent No. 1,578,875, wherein the boss is provided with a single grooved or tapered protuberance which is received in a preformed hole in a metal panel or the like and subsequently subjected to pressure in order to bend or to flow the supporting metal into the groove.

Irrespective of the advantages claimed for present day "blade type" fasteners it may be said generally that they do not provide a truly permanent or, indeed, shake-proof connection. In fact, such fasteners can usually be removed by the application of an axial force substantially no greater than is required in their attachment. Further, their blades cannot ordinarily be used in fastening a boss to a support constituted of solid metal.

While fasteners of the second mentioned type can be applied to a metal support and cannot be pulled out without tearing the metal surrounding the aperture in which the protuberance is seated, the usually circular contour of the protuberance permits undesired rotary displacement. It affords no practical solution of this problem to provide the protuberance with a corrugated surface, or to make it in the form of a key, since such odd-shape parts require an expensive milling operation which cannot conveniently be done on a standard screw machine. The alternate prior art solution of the problem of preventing undesired rotary displacement involves the use of a high powered press for sinking the head of the boss into the surface of its support. This solution, however, is an unsatisfactory one, since high powered presses are cumbersome, require a large capital investment and, further, are expensive to operate and to service.

Accordingly, the principal object of the present invention is to provide an improved staked type fastener and one which obviates the foregoing and other less apparent objections to analogous prior art fasteners.

Another and related object of the invention is to provide an improved method of, and means for, so staking a boss to a metal panel or the like that the leading end of the boss will be flush with the surface of the panel, and this too, without using a counterboring or countersinking operation upon either surface of the said panel.

Another and important object of the invention is to provide an improved means for attaching an electrical connector to an aluminum base, said means affording a direct connection to the highly conductive sub-surface portion of the metal, thus obviating the necessity for providing the usually oxidized (and hence, "insulating") surface of the aluminum with a conductive coating.

Still another object of the invention is to provide a simple, inexpensive, reliable, shake-proof, metal fastener of the general character described, and one which lends itself readily to mass production methods, e. g., on a standard screw machine.

Certain preferred details of construction, together with other objects and advantages will be apparent and the invention itself will be best understood by reference to the following specification and to the accompanying drawing, wherein:

Fig. 1 is a perspective view of a threaded metal nut incorporating a stake-type fastener within the invention.

Figs. 2, 3 and 4 are diagonal sectional views showing successive steps in attaching the fastener of Fig. 1 to a metal plate in accordance with the method of the invention.

Fig. 5 is a diagonal sectional view of the nut of Fig. 1 completely attached to the plate of Figs. 2 to 4.

Fig. 6 is a diagonal sectional view of the fastening means of Fig. 1 applied to a so-called "elastic stop nut."

Fig. 7 is a diagonal sectional view of an alternative embodiment of the invention as applied to a threaded all-metal nut, Figs. 8 and 9 are similar sectional views showing a two step method of attaching the nut of Fig. 7 to a metal plate, Fig. 10 is a view partly in elevation and partly in diagonal section showing the fastener of Fig. 7 applied to an alternate fixture or boss and Fig. 11 shows a modified embodiment of the invention especially adapted for attaching a boss to a relatively thick support.

Like reference characters designate the same or corresponding parts in all figures.

The present invention contemplates, and its practice involves, the provision of one or more prongs 1, of a special construction (later described), arranged preferably at the corners of the under side of a square, hexagonal, or other preferably non-circular metal fixture or boss such, for example, as the threaded all-metal nut 2, of Fig. 1; 2d, Fig. 11; the part metal, part fibre "elastic stop nut" 2a of Fig. 6, or the unthreaded solid terminal 2c of Fig. 10. In the embodiments of the invention which have been selected for illustration the under side of the boss 2, is also shown provided with a centrally located protuberance 3 which is adapted to be received in a circular hole 4 (see Fig. 2) in a plate-like support 5 to which the boss 2 is to be affixed. This protuberance 3 has a circular major face 6 and a tapered side or minor face 7 which slants inwardly, preferably at an angle of substantially 15° with respect to the central axis of the boss, so that its maximum diameter is adjacent to its leading end 6 and its minimum diameter adjacent to the base 8 of the boss. Contrary to the prior art practice, the length or axial dimension of this frusto-conical protuberance 3 corresponds, substantially, to the thickness dimension of the panel 5, hence when the attaching operation has been completed (see Fig. 5), the major face 6 of the said protuberance is caused to lie flush with the "under" surface of the panel 5 although the said panel is neither counterbored nor countersunk.

As previously indicated, the prongs 1 are of special construction. Thus, each prong is provided with an inclined face 9 which slants off from the base 8 of the boss 2, preferably at angle of substantially 30° with respect to a line drawn perpendicular to the base; further, in accordance with the invention, the said prongs are sufficiently rigid to pierce the surface of the metal panel or support 5 and yet are flexible enough to be bent by the force encountered by their inclined face 9 when the said faces are pressed into the body of the support. In the illustrated embodiments of the invention the inclined faces 9 of the prongs 1 slant outwardly and hence are bent outwardly (see Fig. 3) as they extend into the metal support 5. It is possible to provide the prongs with an inward instead of an outward slant so that when they are pressed into the panel they will bend in the direction of the central axis of the boss; but this latter arrangement has been found not as effective in preventing rotation as where the prongs slant outwardly and are caused to be bent radially outwardly, as shown in Fig. 3.

As a practical matter it is preferable to make the prongs 1 in the form of triangular pyramids integral with the base or "under" surface 8 of the boss and to so arrange the said pyramids on the said base that their straight sides 11 and 12 form the corners of the boss and the slanting sides 9 all face the center of the boss, as clearly shown in Fig. 1. The described form and arrangement of the prongs 1 is especially desirable where, as in Figs. 1 to 9 inclusive, the boss 2 comprises a threaded nut, since, in this case, both the frusto-conical protuberance 3 and the triangular pyramids 1 can be cut out as one of the operations of the screw machine employed in tapping the threaded hole 13.

In order to ensure that the prongs 1 will undergo the proper direction and degree of distortion when they are pressed into the body of the support 5 it is necessary that the dimensions of the prongs be chosen with a careful regard to the nature and thickness of the material to which they are to be affixed. Thus, it is ordinarily essential that the prongs be constituted of a harder material than the support to which they are to be affixed and should preferably, but not necessarily, be no longer than the thickness dimension of said support. In one typical installation wherein the fastener was constructed for attachment to an aluminum sheet of from .061" to .067" thick and which was provided with a hole of from .217" to .220" diameter, the boss 2 was constituted in its entirety of $\frac{5}{16}$" square screw steel and had the following dimensions: Altitude of prongs as measured from the plane of their base .050": slant of sloping face of prongs, 30° with respect to the perpendicular; altitude of frusto-conical protuberance .060": diameter of its leading end .215"; inward slant of side face, 15°. Substantially the same relative dimensions obtain when the support comprises soft steel, but in this event the fastener should preferably be constituted of a nickel-steel or similar alloy substantially harder than soft steel support.

As above indicated, the altitude of the central protuberance 3 is appreciably greater than that of the prongs 1. Thus, referring now to Fig. 2, in attaching the fastener to the support 5 the support may simply be laid on the base 14 of a press 14—16 and the fastener 2 dropped or otherwise placed, with the prongs down, in position on the support so that the central protuberance 3 fits in the aperture 4 with which the support is provided. When the boss is provided with a central bore or tapped hole 13 the bed of the press may be provided with a centering pin 15 if desired, but this is not essential since the protuberance 3 will itself serve satisfactorily to center the boss on its support 5.

Referring particularly to Fig. 3, the next step in the attaching operation is to bring the head 16 of the press 14—16 down on the boss with the relatively small force required to urge the prongs 1 into the body of the metal support 5. As previously set forth, when the prongs are pressed into the body of the support 5 their slanting faces 9 cause the prongs to be bent within the supporting material in the (outward) direction of their slant and the now bent prongs serve to permanently secure the boss or fasteners against undesired rotation. It will be observed upon careful inspection of Fig. 3 that at this stage in the attaching operation there is a circular void, shown at 17, between the inner portion or base of the frusto-conical protuberance 3 and the surrounding portion of the supporting plate 5. This void 17 is subsequently filled in, in accordance with the invention by peening the metal immediately surrounding the said void. (As will hereinafter more fully appear this peening operation involves the use of a localized "directed" peening force of small intensity and hence obviates the use of the relatively enormous compression force heretofore employed in sinking the head of the analogous prior art fasteners into the metal to a depth sufficient to flow the metal beneath the head into engagement with the tapered shank of the fastener.)

In the method step illustrated by Fig. 4 the peening force for flowing the metal into the void 17 is provided by a circular, beveled die or tool 18, which, in the instant case, is shown mounted on the head 19 of a separate press, but which may be mounted for retractible vertical movement in the bed 14 of the same press (14—16) employed in attaching the prongs 1 to the support 5. It will be observed that the circular leading edge of this tool 18 is of a diameter slightly greater than the diameter of the flat surface 6 of the protuberance or shank 3 of the boss 2 and that its beveled surface slants inwardly from said edge. Hence, when the work is properly centered on the upstanding pin 15, and the head of the press brought down, the metal surrounding the leading surface 6 of the protuberance will be urged downwardly and inwardly by the slanting face of the tool 18 and will flow into the void 17, completely and permanently filling it. As shown in Fig. 5, the only irregularity resulting from the impress of the peening tool 18 upon the supporting panel 5 is the narrow circular groove 20 surrounding the flush surface of the central protuberance 3 on the boss 2.

The above described separate peening operation can be dispensed with (and the circular groove 20 in the "under" surface of the support 5 resulting from the use of the separate peening tool 18 of Fig. 4 can be eliminated) in accordance with the invention, by making the peen an integral and permanent part of the boss. Thus, as shown in Figs. 7, 8, 9, and 10 the boss 2 (2b, 2c) may be provided with an integral peening element in the form of a circular beveled projection 21 arranged in the space between the frusto-conical protuberance 3 and the prongs 1. This added projection 21 is preferably made shorter than the prongs 1 so that, as shown in Fig. 8, it does not interfere with the centering of the frusto-conical protuberance 3 in the aperture 4 of the support 5. The inner or beveled face of the peen preferably extends parallel to the minor (side) face 7 of the central protuberance 3; that is to say, it preferably has the same degree (e. g. 15°) and (outward) direction of slant as the said protuberance.

As above indicated, the integral peen 21 on the bosses 2b and 2c, shown in Figs. 7 to 10 inclusive, has the same function as the separate peening tool 18 shown on Fig. 4; that is to say, when it is pressed into the support, as shown in Fig. 9, it serves to flow the metal surrounding the aperture 4 (Fig. 4) into the void which would otherwise be present adjacent to the narrow base of the frusto-conical protuberance 3.

The use of a fastener which has been provided with an integral peen 21 is especially recommended where the boss comprises an electric element such, for example, as the grounding terminal or binding post 2c of Fig. 10 since, in this case, the electrical continuity between the terminal and the metal support to which it is attached is greatly enhanced by the additional contact area which the peen presents to the highly conductive sub-surface portion of the metal support.

When the fastener of the invention is to be attached to a relatively thick (say 0.120″+) support it is preferable to employ the embodiment of the invention shown in Fig. 11. Here, it will be observed, the central protuberance 3 comprises a straight-sided cylindrical portion 3a integral with the base of the boss 2d and a superimposed integral frusto-conical portion 3b. The leading end or exposed face 6a of this frusto-conical portion 3b is of substantially the same diameter as the base portion 3a and its side or minor face tapers inwardly in the direction of the central axis of the boss, so that there is a circular land or step around the protuberance where the frusto-conical portion 3b joins the cylindrical portion 3a. Thus, when this boss is inserted in the aperture of a thick metal plate the void about the said "step" can be conveniently filled by the use of localized pressure applied by the peening tool 18 of Fig. 4 to the opposite or "under" side of the plate.

It will be apparent to those skilled in the art to which this invention appertains that the present invention is susceptible of various modifications (including a reversal of parts), and is capable of numerous applications in addition to the ones herein specifically described. Accordingly, it is to be understood that the foregoing description of certain preferred embodiments of the invention is to be interpreted as illustrative and not in a limiting sense except as required by the prior art and by the spirit of the appended claims.

What is claimed is:

1. As a new article of manufacture, a boss comprising a base having a plurality of triangular pyramids thereon for staking said boss to a metal support, said base and said triangular pyramids being constituted of a single piece of steel, said triangular pyramids being of the type having but a single inclined face and constituted of steel sufficiently rigid to permit their apexes to pierce the surface of said metal support without being substantially distorted, yet flexible enough to be distorted by the forces encountered by their inclined faces when said faces are pressed into the body of said support.

2. The invention as set forth in claim 1 and wherein said inclined faces of said triangular metal pyramids slant off in the direction of the external boundary of said base.

3. A fastener for attaching a part to an apertured support, said fastener comprising a base having an inwardly tapering circular protuberance thereon adapted to be entered into said aperture and of a length corresponding substantially to the thickness dimension of said support, and means integral with said base for preventing rotation of said circular protuberance in said aperture.

4. The invention as set forth in claim 3 and wherein the tapered surface of said protuberance slants off from said base at an angle of substantially 15° with respect to a line drawn perpendicular to said base.

5. The combination with a boss comprising a base and an inwardly tapering protuberance on said base, of a peen integral with said base adjacent to and surrounding said protuberance, said peen having an inclined face which slants off from said base at substantially the same angle as the tapered surface of said protuberance.

6. A boss for attachment to a metal support having an aperture therein, said boss comprising a base, an inwardly tapering protuberance on said base, the length of said protuberance corresponding substantially to the thickness dimension of said metal support and having a maximum diameter adjacent to its free end corresponding substantially to the diameter of said aperture and a plurality of prongs arranged in spaced relation on said base about said protuberance for staking said boss to said metal support, said prongs each having an inclined face which slants off from said base to a point and being constituted of a material sufficiently hard to pierce the metal of which said support is constituted without being substantially distorted, yet flexible enough to be bent within said metal by the force encountered by said inclined faces as said prongs are pressed into said support.

7. A device of the character described comprising a base, an inwardly tapering protuberance centrally located on said base, a plurality of prongs arranged in spaced relation on said base for staking said device to a support, and a peen on said base in the space between said protuberance and said prongs for flowing the supporting material into engagement with the tapered surface of said protuberance.

8. The invention as set forth in claim 7 and wherein said peen comprises a circular projection surrounding said centrally located tapered protuberance.

9. Method of attaching a boss to a metal support having an aperture therein, the said article comprising a base provided with an inwardly tapered protuberance centrally located thereon and a peening member having an inclined face spaced from said protuberance, the said method comprising fitting the said protuberance within said aperture and applying a force to the assembly sufficient to cause, through the localized action of the peening member, metal of the support beneath the base to flow into engagement with the tapered surface of the protuberance.

10. The method of attaching a boss, comprising a base having an inwardly tapering protuberance centrally located thereon, to a metal support having an opening therein, said method comprising inserting said protuberance into said opening and subsequently applying a peening force only along a line of the metal of the support immediately adjacent to said protuberance and inwardly spaced from the edge of said base to peen that portion of the metal of the support between the line of application of said force and said protuberance into engagement with the tapered surface of said protuberance.

SAMUEL H. WATSON, Jr.

REFERENCES CITED

The following references are of record in the file of this patent:

UNITED STATES PATENTS

| Number | Name | Date |
| --- | --- | --- |
| 66,100 | McMurtry | June 25, 1867 |
| 134,649 | Delfer | Jan. 7, 1873 |
| 448,836 | Kenehan | Mar. 24, 1891 |
| 940,083 | Stimpson | Nov. 16, 1909 |
| 945,737 | Anderson | Jan. 11, 1910 |
| 1,112,525 | Darling | Oct. 6, 1914 |
| 1,156,798 | Meaker | Oct. 12, 1915 |
| 1,873,895 | Kimbell | Aug. 23, 1932 |
| 1,883,906 | Hasselquist | Oct. 25, 1932 |
| 1,919,552 | Hasselquist | July 25, 1933 |
| 1,919,940 | Hall | July 25, 1933 |
| 2,054,187 | Almdale | Sept. 15, 1936 |
| 2,102,558 | Johnson | Dec. 14, 1937 |
| 2,138,404 | Haas | Nov. 29, 1938 |
| 2,225,654 | Olson | Dec. 24, 1940 |
| 2,236,180 | Kost | Mar. 25, 1941 |
| 2,244,427 | Miller | June 3, 1941 |